United States Patent [19]

Huntley

[11] Patent Number: 4,920,346
[45] Date of Patent: Apr. 24, 1990

[54] UNIDIRECTIONAL AMPLITUDE SENSITIVE NOISE RIDING THRESHOLD CIRCUIT

[75] Inventor: William P. Huntley, Old Lyme, Conn.

[73] Assignee: The United States of America as represented by the Secretary of the Navy, Washington, D.C.

[21] Appl. No.: 373,955

[22] Filed: Jun. 30, 1989

Related U.S. Application Data

[63] Continuation-in-part of Ser. No. 176,958, Apr. 4, 1988, Pat. No. 4,860,013.

[51] Int. Cl.$^5$ .............................................. G01S 13/00
[52] U.S. Cl. ....................................... 342/91; 328/162
[58] Field of Search .................... 342/90, 91; 328/162, 328/165; 307/494

[56] References Cited

U.S. PATENT DOCUMENTS

| | | | |
|---|---|---|---|
| 3,781,569 | 12/1973 | Rosenbaum et al. | 342/91 |
| 3,961,274 | 6/1976 | Jones et al. | 328/162 X |
| 4,228,435 | 10/1980 | Nevin | 342/91 |
| 4,309,763 | 1/1982 | Passmore et al. | 328/162 X |
| 4,377,759 | 3/1983 | Ohhata et al. | 328/162 X |
| 4,806,933 | 2/1989 | Halsey et al. | 342/91 |

Primary Examiner—Thomas H. Tarcza
Assistant Examiner—Mark Hellner
Attorney, Agent, or Firm—Michael J. McGowan; Prithvi C. Lall

[57] ABSTRACT

An RF multiplexer divides an incoming signal from an RF antenna into discrete frequency bands. Each frequency band has its own separate circuit on separate lines to operate on the frequency band and determine if a radar signal is present or if only noise is present on the line. This is done by comparing the incoming signal for magnitude with a DC signal that is generated within the circuit and is proportional to the noise within the frequency band. An indication that any of the signals within the discrete frequency bands exceed the DC signal generated within the same band results in an alarm indication.

2 Claims, 2 Drawing Sheets

UNIDIRECTIONAL AMPLITUDE SENSITIVE NOISE RIDING THRESHOLD CIRCUIT

STATEMENT OF GOVERNMENT INTEREST

The invention described herein may be manufactured and used by or for the Government of the United States of America for governmental purposes without the payment of any royalties thereon or therefore.

This application is a continuation-in-part of application Ser. No. 07/176,958 now U.S. Pat. No. 4,860,013 filed April 4, 1988 for Automatic Thresholding Multichannel Digital Early Warning System.

BACKGROUND OF THE INVENTION (1) Field of the Invention

The present invention relates to a circuit within a radar early warning system. More particularly it relates to a unique noise riding threshold circuit as one of its components.

(2) Description of the Prior Art

Prior to the present invention early warning radar receivers utilized summation of many RF bands following initial RF detection. This was followed by pulse stretching, additional amplification and an audio output. Due to many channels being summed together the summed video noise rises and sensitivity suffers. Due to difficulty in discerning between radar pulses and noise the audio output warning of radar illumination was reduced in reliability. The above difficulty led to the invention of a new early warning system of which the present invention is one of the circuits within the system.

SUMMARY OF THE INVENTION

The present invention is a noise riding threshold circuit that is utilized in a radar omnidirectional passive early warning system. In the present system, a noise compensator receives a signal and generates a DC voltage level that is proportional to the noise level of the signal. A threshold comparator receives both the signal received by the noise compensator and the generated DC voltage level. The threshold comparator provides an output signal only when the signal received by both the noise compensator and comparator exceeds the DC voltage level from the noise compensator by a predetermined value.

DESCRIPTION OF THE PREFERRED EMBODIMENT

Figure 1:
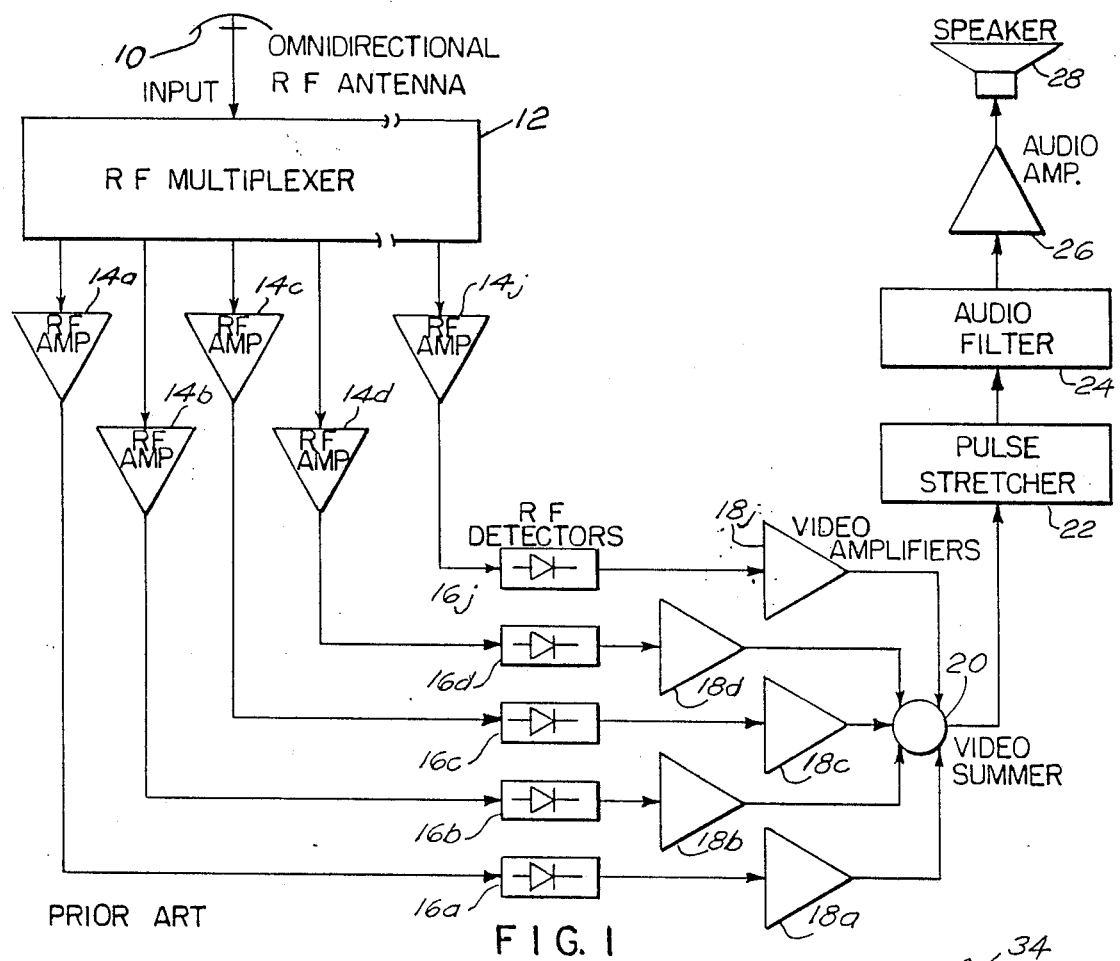
FIG. 1 is a diagram of a prior art early warning radar receiver.

Referring now to FIG. 1 there is shown a prior art embodiment of a multiband early warning radar system. An omnidirectional RF antenna 10 receives a signal and provides it to an RF multiplexer 12. The RF multiplexer divides the signal into a plurality of discrete frequency bands and provides these signals to respective RF amplifiers 14a–j. These signals, each within a discrete frequency band are supplied to respective RF detectors 16a–j. Although the number of bands utilized is somewhat arbitrary, ten bands are chosen for all embodiments described herein. The respective signals are then processed by video amplifiers 18a–j. The output signals of the video amplifiers 18a–j are transmitted to video summer 20. The video summer 20 provides an output signal that will contain not only the radar emission signal but the video noise signal as well. Since all channels contain noise signals, but not all contain a radar emission signal, the summation of the input signals by video summer 20 tends to overwhelm any radar emission signal with noise. As a result sensitivity suffers. The output signal of video summer 20 is then processed by pulse stretcher 22 and audio filter 24. Following this the signal is received by an audio amplifier 26 and speaker 28 that provides an audible warning.

Figure 2:
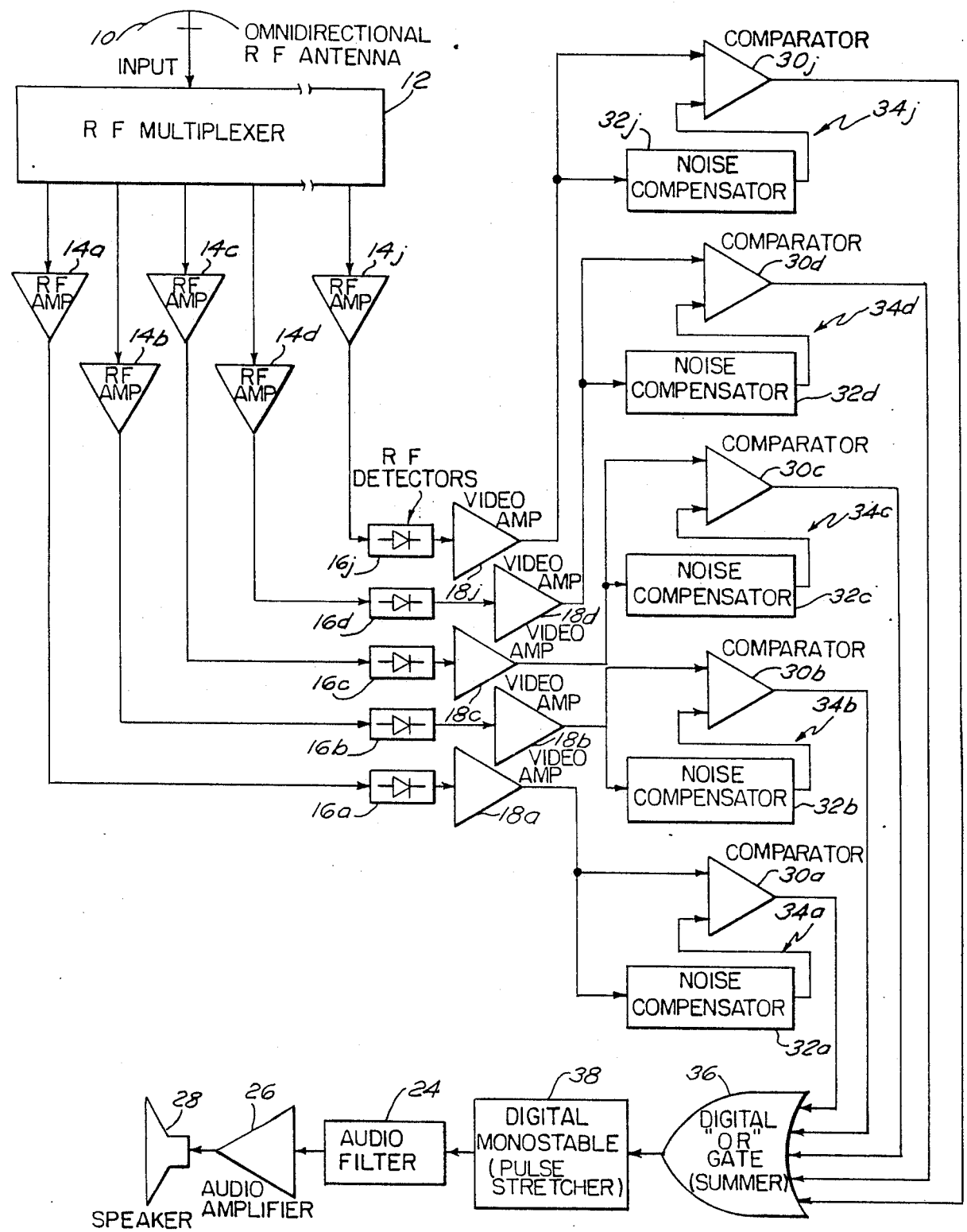
FIG. 2 shows a diagram of a new early warning radar receiver.

FIG. 2 shows a new system arrangement wherein similar components to those of prior art FIG. 1 have the same identifying numeral. In FIG. 2 a signal received by omnidirectional antenna 10 is processed by RF multiplexer 12, RF amplifiers 14a–j, RF detectors 16a–j and video amplifiers 18a–j in a similar manner to that described with reference to FIG. 1.

FIG. 2 then shows that the signal from each video amplifier 18a–j is provided individually to both a comparator 30a–j and a noise compensator 32a–j. In addition, each noise compensator 32a–j provides its output signal to a respective comparator 30a–j. Each combination of a comparator 30a–j and a respective noise compensator 32a–j are included in a noise riding threshold circuit 34a–j which will be described in greater detail later. Signals from each of the comparators 30a–j within noise riding threshold circuits 34a–j that break threshold provide individual inputs to the same digital OR gate 36. The OR gate 36 on receipt of a signal from any comparator 30a–j provides a signal to a digital monostable 38 which provides a pulse stretching function and therefore increases the energy content of the narrow pulses. An audio filter 24 is then utilized to reduce high frequency electro-magnetic interference (EMI). The output of audio filter 24 is conducted to an audio amplifier 26 that drives a speaker 28 providing an audible warning.

Figure 3:
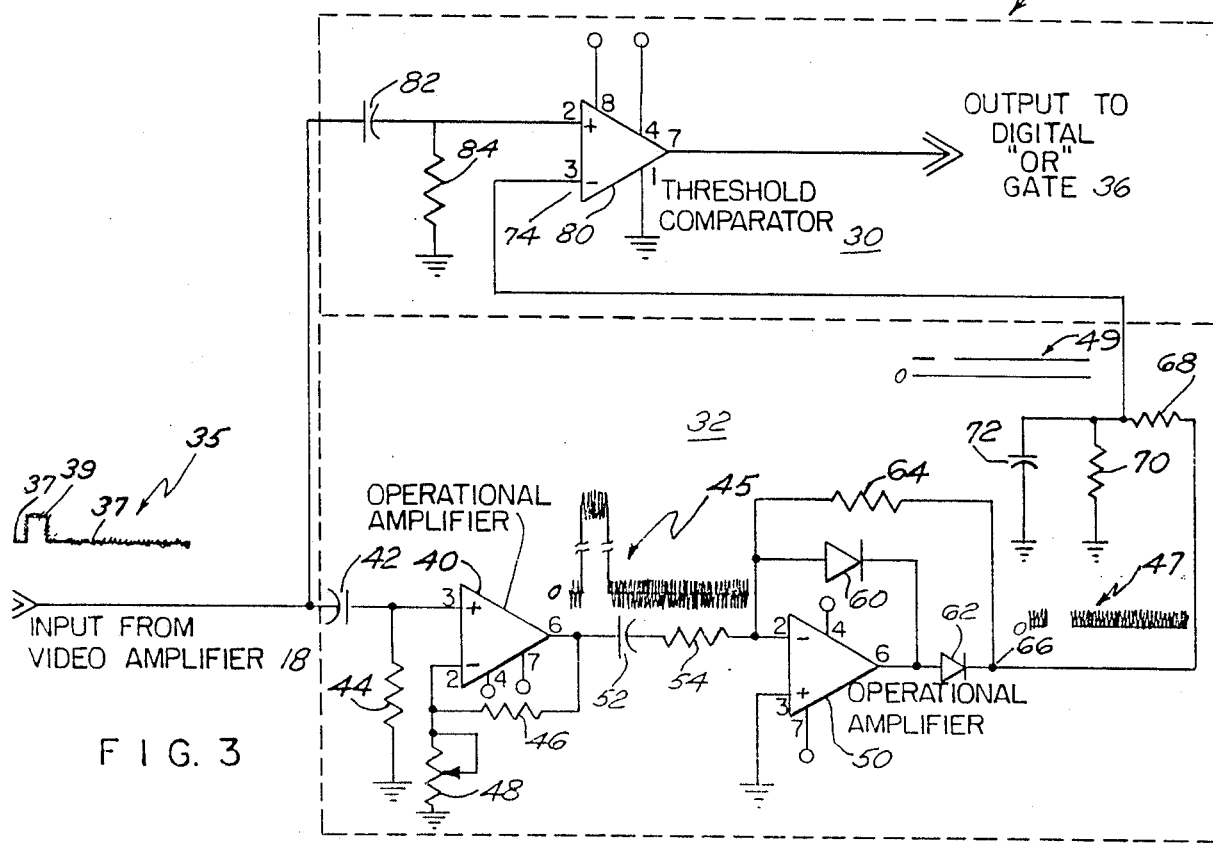
FIG. 3 is a schematic diagram of a noise riding threshold circuit shown in FIG. 2 in accordance with the present invention.

Refer now to FIG. 3 for a detailed description of noise riding threshold circuit 34. All noise riding threshold circuits 34a–j of FIG. 2 operate in the same manner. All components described in FIG. 3 use only numerals. These components are identical to the ones in FIGS. 1 and 2 that have the same numerals and an identifying letter.

The noise compensator 32 and the comparator 30 within the noise riding threshold circuit 34 receive an input signal 35 from video amplifier 18. The input signal 35 is comprised of noise components 37 and the radar emission pulse 39. The radar emission pulse 39 only appears for a short period of time in a complete cycle. Obviously if there is no received pulse at antenna 10 of FIG. 2 only the noise components 37 will be present. The noise components 37 appear throughout the cycle. In the present invention the DC level of the video amplifier 18 output is about 1.5 volt.

Within noise compensator 32 an operational amplifier 40 receives the input signal 35 from video amplifier 18 through a DC blocking capacitor 42 and a load resistor 44. Resistor 44 establishes the DC input level at 0 volts. Operational amplifier 40 has connected to it a resistor 46 and a variable resistor 48 so that the operational amplifier 40 functions as a high impedance non-inverting amplifier. The amount of gain can be adjusted by the variable resistor 48. In the present system the gain is approximately ten. The output signal of operational amplifier 40 is supplied to an operational amplifier 50 through a high pass filter comprised of a capacitor 52 connected in series with a resistor 54. The operational amplifier 50 has its non-inverting input terminal grounded. The operational amplifier 50 in conjunction with diodes 60 and 62, and resistor 64 is arranged as a rectifier circuit. The output of the rectifier circuit appears on terminal 66 and is applied to a low pass filter comprised of resistors 68 and 70, and capacitor 72 for providing a DC voltage from the inverted rectified video noise signal. In effect the noise compensator 32 provides a DC output voltage at terminal 74 that is proportional to the negative portion of the input noise signal. The above sequence is shown by waveform 45 which is the amplified output of operational amplifier 40. This is followed by waveform 47 which is the negative portion of waveform 45 inverted. The low pass filter of resistors 68 and 70, in conjunction with capacitor 72 then provide the DC noise voltage 49.

The output signal from video amplifier 18 is also supplied to the positive input of threshold comparator 80 through DC blocking capacitor 82. A load resistor 84 connects the positive input of threshold comparator 80 to ground establishing the DC input level at 0 volts, similar to that of amplifier 40 of noise compensator 32. The output 51 of threshold comparator 80 is the output of comparator 30 and noise riding threshold circuit 34. This output needs the pulse 39 to exceed the DC noise level to provide the pulse output 51. This is supplied to digital OR gate 36 as previously described.

In operation the output of the video amplifier 18 serves as input to the noise compensator 32. The video noise signal 35 from video amplifier 18 is fed to non-inverting ac amplifier 40 where its voltage is amplified. This amplification allows linear detection in the next stage using the medium bandwidth operational amplifier 50. Operational amplifier 50 and its circuits form a linear detector that detects the negative peaks of the noise signal while ignoring the positive video pulses that may attempt to desensitize the circuits. Resistor 68 and capacitor 72 integrate the peak pulses to produce the DC voltage 49 that is proportional to the negative noise peaks of the input video signal 35. This DC voltage is applied to the comparator 30 at the negative input of threshold comparator 80. The video input signal 35 is also fed to threshold comparator 80 through DC blocking capacitor 82. When the video signal on threshold comparator 80 that was fed through DC blocking capacitor 82 exceeds the DC voltage 49 formed by resistor 68 and capacitor 72 from operational amplifier 50 a signal is formed at the output of threshold comparator 80. This output signal is fed to the digital OR gate 36 and through further processing becomes an audible alarm.

The system described above allows multichannel operation in early warning systems without noise degradation due to analog noise summation. The use of medium bandwidth noise compensation circuits makes the multichannel system feasible with regard to physical space and power dissipation.

As an alternative the addition of a computer interface to a multichannel system would allow energy detection in a computerized receiver system. The computer system can direct a narrow band receiver to certain frequency bands if analysis is required. Also, the addition of light emitting diode (LED) circuits at the outputs of the threshold comparators would provide visual indications as to what RF frequency bands provide the audible warning.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A unidirectional amplitude sensitive noise riding threshold circuit comprising:
    a noise compensator connected to receive a signal, said noise compensator having processing means for generating a DC voltage proportional to the noise within said received signal, said noise compensator further comprising, first amplification means connected to receive said signal, said first amplification means having a wide dynamic range for amplifying said signal, a high pass filter, connected to receive said amplified signal from said first amplification means, for discriminating against low frequency and DC noise components thereof, and second amplification means connected to receive said amplified and filtered signal from said high pass filter, said second amplification means for rectifying said received signal and for generating a DC voltage proportional to the noise within the signal received by said first amplification means; and
    a comparator connected to receive at one input the same signal as that received by said noise compensator, and to receive at another input said DC voltage from said noise compensator, said comparator providing a predetermined output signal when said amplitude of said signal received by said noise compensator and said comparator exceeds said DC voltage from said noise compensator.

2. A unidirectional amplitude sensitive noise riding threshold circuit according to claim 1 wherein said second amplification means further is for inverting said amplified signal and for generating said DC voltage proportional to the noise within the negative portion of the signal received by said first amplification means.

* * * * *